United States Patent [19]

Barksdale

[11] Patent Number: 4,620,623
[45] Date of Patent: Nov. 4, 1986

[54] PIN LOADING CONE SYNCHRONIZING CLUTCH

[75] Inventor: John S. Barksdale, Ypsilanti, Mich.

[73] Assignee: Ford Motor Company, Dearborn, Mich.

[21] Appl. No.: 695,770

[22] Filed: Jan. 28, 1985

[51] Int. Cl.[4] ............................................. F16D 23/06
[52] U.S. Cl. .................................. 192/53 E; 192/53 F
[58] Field of Search ........................... 192/53 E, 53 F

[56] References Cited

U.S. PATENT DOCUMENTS

| | | | |
|---|---|---|---|
| 2,035,507 | 3/1936 | Robbins | 192/53 E |
| 2,395,189 | 2/1946 | Lapsley et al. | 192/53 E |
| 2,410,511 | 11/1946 | Letsinger et al. | 192/53 E |
| 2,479,184 | 8/1949 | Peterson et al. | 192/53 E |
| 2,635,478 | 4/1953 | Wolfe | 192/53 E |
| 2,930,462 | 3/1960 | Willis | 192/53 E |
| 3,286,801 | 11/1966 | Wojcikowski | 192/53 E |
| 3,451,513 | 6/1969 | Altmann | 192/53 E |
| 3,552,531 | 1/1971 | Grosseau | 192/53 F |
| 3,804,218 | 4/1974 | Krutashov | 192/53 E |
| 3,861,509 | 1/1975 | Inoue et al. | 192/53 F |
| 3,910,390 | 10/1975 | Eichinger | 192/53 E |
| 4,138,007 | 2/1979 | Wakabayashi | 192/53 E |
| 4,141,440 | 2/1979 | Richards | 192/53 F |
| 4,280,370 | 7/1981 | Schreiner | 192/53 F X |
| 4,462,489 | 7/1984 | Morscheck | 192/53 E |

Primary Examiner—George H. Krizmanich
Attorney, Agent, or Firm—Frank G. McKenzie; Donald J. Harrington

[57] ABSTRACT

A pin loading synchronizer includes a hub fixed to a shaft and located between gears journalled on the shaft. The hub carries a synchronizer sleeve that is moved by the vehicle operator into engagement with spline teeth formed integrally with the gears. Each gear carries a cone element that is engageable by external cone members carried on arms that extend through the sleeve. A detent spring in the form of a wire hoop retained on the sleeve resiliently expands radially outward against the interior surface of the cone arm and into a seated position on a detent recess formed on the arm.

8 Claims, 3 Drawing Figures

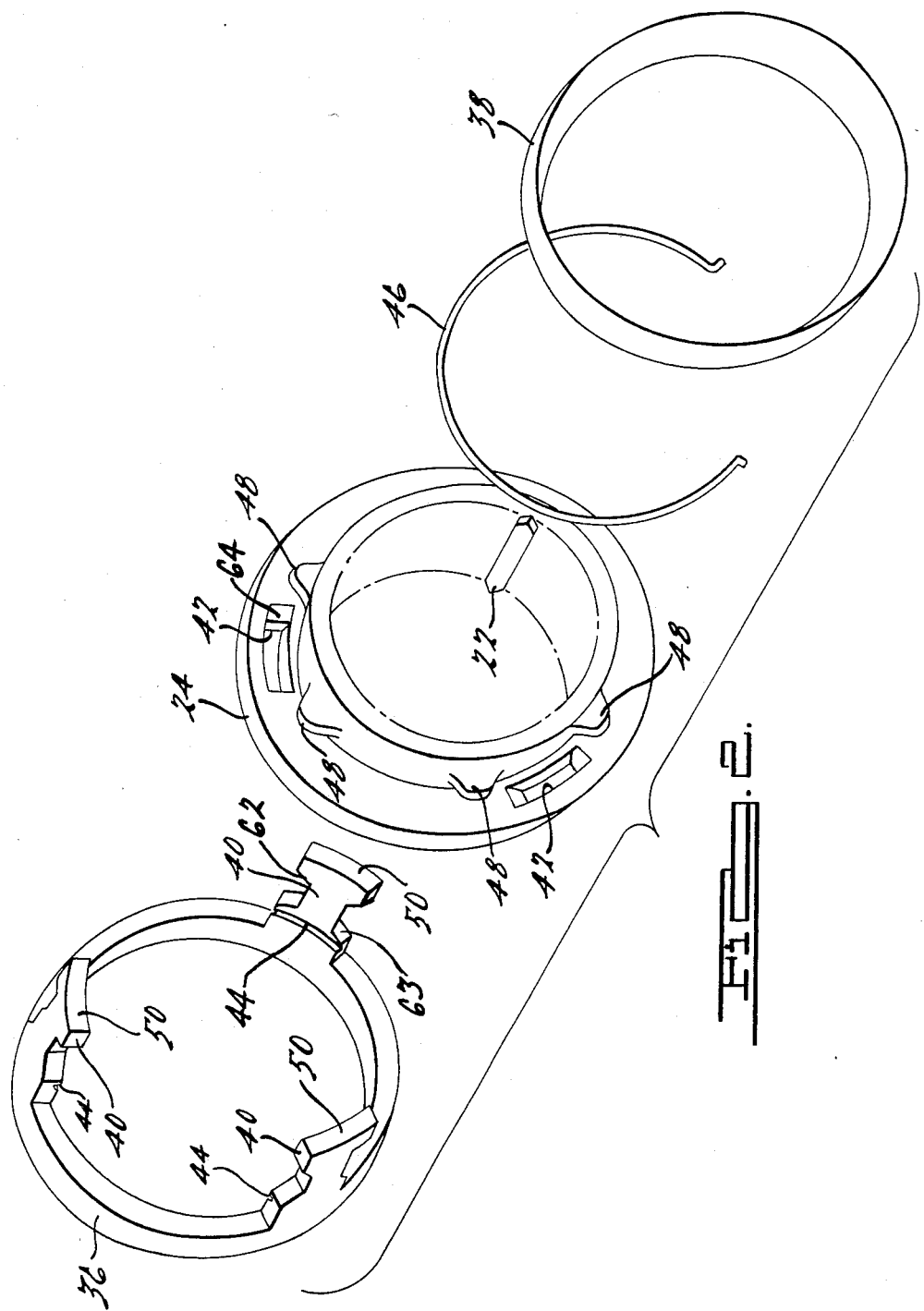

PIN LOADING CONE SYNCHRONIZING CLUTCH

BACKGROUND OF THE INVENTION

1. Field of the Invention

This invention relates to a synchronizing clutch for a manual transmission. More particularly, the invention pertains to a blocking type synchronizing clutch having conical friction components for speed synchronization and clutching teeth for power transmission.

2. Description of the Prior Art

The pin loading synchronizing clutch art includes a class of blocking synchronizers in which a cone clutch is used to synchronize the speed of a gear with the speed of the synchronizer clutch hub through frictional contact and before a positive mechanical connection is made through the engagement of spline teeth. When the clutch sleeve is moved toward a gear, it contacts a tapered surface on the shoulder of pins, which extend through the clutch sleeve and carry at their ends conical friction surfaces that engage internal conical friction surfaces fixed to the gear. The holes through which the pins pass in the sleeve are oversized in relation to the size of the pins and torque developed on the conical friction surfaces drives the pins against one side of the sleeve hole. A chamfer on the pin also causes a torque, which is opposed to the cone torque but of slightly lower magnitude. Therefore, the sleeve will not move axially toward the gear until this block is removed. When speed synchronization is completed and the cone torque drops to zero, the torque caused by the sleeve riding on the pin chamfers moves the pins aside and lock-up is completed on a set of splines. Examples of synchronizers of this type are described in U.S. Pat. Nos. 3,286,801 and 4,138,007.

One disadvantage of conventional pin type synchronizer clutches, especially when they are used in small manual transmissions, is that the external cone element attached to the gear appreciably increases the rotating inertia of the gear about its polar axis and therefore increases the work required of the vehicle operator to produce a gear change. It is preferable that the positions of the internal and external cone elements be reversed from the positions they occupy in conventional prior art synchronizing clutches by placing the internal cone element on the gear and the external element on the synchronizer. This change reduces the reflected inertia of the components that must be synchronized during a gear change in a manual transmission. U.S. Pat. No. 4,138,007 shows the conventional location of the internal element fixed to the gears. U.S. Pat. Nos. 2,395,189, 2,451,513 and 2,479,184 describe the location of the external cone element fixed to the gears and the internal cone element fixed to the synchronizer.

SUMMARY OF THE INVENTION

In the present invention, the internal cone element is pressed onto the gear and is rotatably fixed to the gear by engaging the gear clutching teeth. The cone element on the gear experiences only compressive forces during synchronization. Therefore, it can be machined from relatively light material such as aluminum or magnesium, provided that the friction surface is properly treated for wear resistance. Alternatively, the cone element can be welded or bonded to the gear.

The synchronizer clutch according to the present invention driveably connects gear wheels journalled on a shaft during a gear change after the speed of the gears is synchronized to that of the shaft. The clutch mechanism includes, in addition to the cone elements fixed to the gears and the clutching teeth on each of the gears, a hub fixed to the shaft and located between the gear wheels. A clutch sleeve is axially moveable with respect to the hub and gear wheels by means of a shifting fork but is otherwise nonrotatably connected to the hub on a set of spline teeth formed on the outer periphery of the clutch hub and radially aligned with the clutching teeth of the gear wheels. A cone arm assembly includes a member having an internal conical friction surface adapted to engage external cone members fixed to the gear wheels. The cone arm extends axially through a radially directed web of the clutch sleeve and has blocking surfaces adapted to contact corresponding blocking surfaces on the clutch sleeve as it is moved axially toward the gear wheels for engagement.

The clutch sleeve defines an annular space located between radial planes, into which is fitted a single hoop wire detent spring retained between the radial planes and the inner surface of the clutch arm assembly. The detent spring is adapted to seat within a recess on the cone arm assembly when the clutch sleeve is in a neutral position midway between the gear wheels. When the clutch sleeve is displaced axially from this position toward the gear wheels, the clutch sleeve forces the detent spring axially out of engagement in the recess. When the sleeve is returned to the neutral position, the detent spring resiliently reseats in the recess.

The clutch arm can be stamped from sheet metal having one cone member formed integrally with the axially extending arms of the assembly. The cone member at the opposite axial end of the assembly can be welded to the free ends of the arms after they are passed through appropriately spaced slots in the synchronizer sleeve. Alternatively, the internal cone members can be forged and then riveted to a radial flange located at each axial end of the cone arm assembly.

By comparison with conventional pin type synchronizers, this invention allows more sleeve travel within the limited axial space provided for a clutch between the gear wheels.

BRIEF DESCRIPTION OF THE DRAWINGS

FIG. 2 is a view showing the components of the clutch of FIG. 1 spaced axially one from another in the order of their assembly prior to joining one internal cone to the cone-pin subassembly.

DESCRIPTION OF THE PREFERRED EMBODIMENTS

Figure 1:
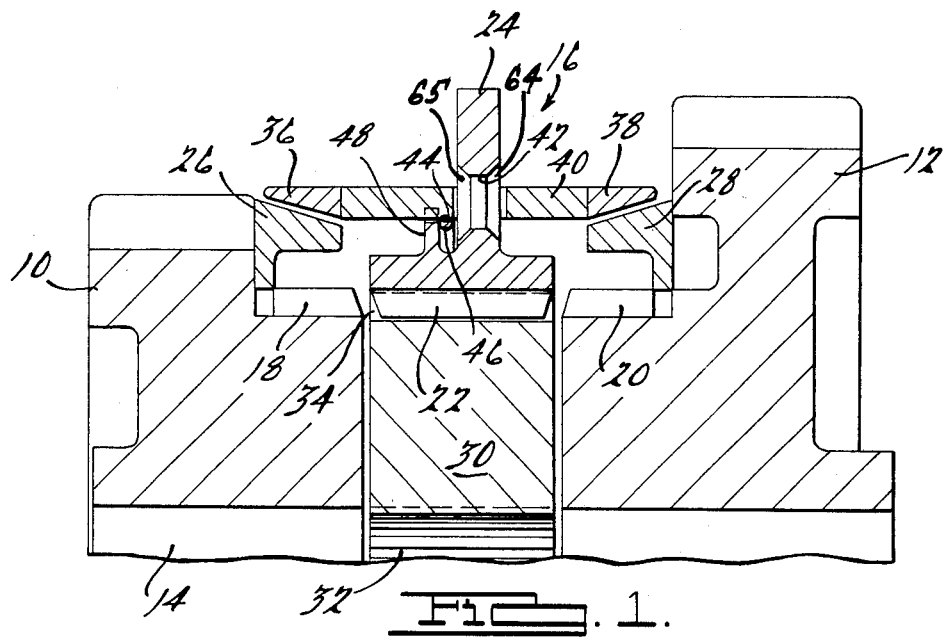
FIG. 1 is a partial cross section taken through a diametral plane of a double acting cone synchronizing clutch and the gear wheels that are driveably connected to the shaft through the synchronizer.

Referring first to FIGS. 1 and 2, gear wheels 10, 12 journalled on the surface of a rotatably mounted shaft 14 in a manual transmission are connected to the shaft through a synchronizing clutch located in the space between the gear wheels. Each gear wheel is formed integrally with clutching teeth 18, 20 adapted to be engaged by the internal teeth 22 formed on the inner surface of the clutch sleeve 24 as the sleeve is moved forward and rearward parallel to the axis of the shaft in the direction of the gear selected for connection to the shaft. Each gear wheel carries a cone element 26, 28, which is fixed by engagement with the clutching teeth 18, 20 against axial movement and rotation relative to the gear wheel on which it is carried.

Synchronizer 16 includes a hub 30 joined to the shaft by a spline connection 32 and driveably connected to the sleeve 24 at its perimeter by axially directed spline teeth 34, with which the internal splined teeth of the sleeve are engaged.

A pin-cone subassembly includes conical elements 36, 38 located at opposite axial ends having conical friction surfaces located on their interior surfaces, which are adapted to be brought into engagement with external conical friction surfaces on the cone elements 26, 28. Several angularly spaced arms 40 extend axially through correspondingly angularly spaced slots 42 in a radially directed web of the clutch sleeve 24, and are joined at opposite axial ends to the conical elements 36, 38.

Each arm 40 has blocking surfaces 62, 63 adapted to contact, respectively, blocking surfaces 64, 65 in the slots 42 of sleeve 24 as the sleeve is moved toward the gear selected for connection by the synchronizer clutch to the shaft. The blocking surfaces are inclined with respect of the shaft axis and, when contacting the corresponding surface of the sleeve, cause the sleeve and cone arm subassembly to move axially as a unit.

Each of the arms has an arcuate groove 44 on its inner surface aligned axially with other grooves into which a breakaway or detent spring 46 is fitted. The spring is located in the annular space between the radial web of the synchronizer sleeve and the angularly spaced, radially directed ears 48. Spring 46 is trapped between the web and the ears on the synchronizer sleeve. When the sleeve is moved axially, the spring is contacted by either the web or the ears and is forced out of groove 44 in order to permit easy axial movement of the sleeve. When the sleeve is returned to the neutral position, the spring returns to a seated position within groove 44 and provides a detent function. The web of the clutch sleeve is offset slightly from the transverse centerline of the synchronizer hub in order to equalize the shift travel in both axial directions from the neutral position toward the gear to be connected to the shaft FIG. 2 shows that the arms can be stamped from metal integrally with one of the external cones 36. The other cone 38 is welded to the free end 50 of each arm after the arms are passed through slots 42 in the synchronizer sleeve. After this assembly is completed, the axial position of the arms relative to the sleeve is established by fitting the spring 46 in the annular space located between ears 48 and the radial web of the arms and into groove 44 on the inner surface of the arms.

Figure 3:
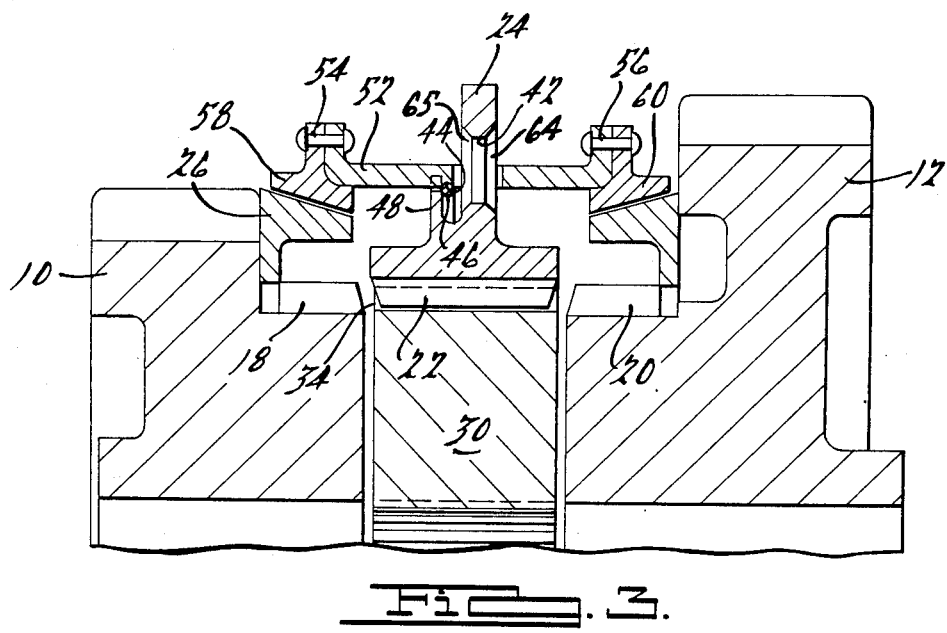
FIG. 3 is a partial cross section through a diametral plane showing another embodiment of the synchronizing clutch according to this invention.

FIG. 3 shows an alternate riveted fabrication technique which can be adopted instead of the welded construction. Here the arms 52 are stamped channel sections whose legs at each axial end of the arm are joined by rivets 54, 56 to conical elements 58, 60, respectively, on which internal conical friction surfaces are formed.

Having described the preferred embodiments of my invention, what I claim and desire to secure by U.S. Letters Patent is:

1. A synchronizing clutch for driveably connecting a rotatably supported member to a shaft comprising:
    clutching teeth fixed to the rotatably supported member;
    a cone element having a conical outer surface fixed to the rotatably supported member;
    a hub rotatably and displaceably fixed to the shaft, located adjacent the rotatably supported member and having a set of spline teeth;
    a clutch sleeve displaceably mounted on the hub for movement into engagement with the clutching teeth, having spline teeth engaged with the spline teeth of the hub and; a radial web having a slot therethrough, the web having a blocking surface located at each opposite axial side thereof;
    a cone arm including a conical inner surface adapted to engage a conical surface on the cone element, a blocking surface adapted to contact the blocking surface of the clutch sleeve as the clutch sleeve is moved axially toward the rotatably supported member, for moving the conical inner surface of the cone arm against the cone element as the clutch sleeve moves toward the rotatably supported member, a recess located on the radially inner surface facing the clutch sleeve and wherein the conical inner surface is fixed to the cone arm by welding or riveting after the cone arm is inserted through the clutch sleeve slot; and
    spring means for resiliently, releasably connecting the clutch sleeve and cone arm before the cone element and conical inner surface of the cone arm engage and for disconnecting the cone arm and clutch sleeve after the conical inner surface of the cone arm and cone element engage, including a wire loop retained in position with respect to the clutch sleeve for axial movement with the clutch sleeve and seatable in the recess of the cone arm.

2. A clutch of claim 1 wherein the clutch sleeve defines a space between axially spaced radial surfaces, into which space the spring means is retained and moved due to contact with the radial surfaces as the clutch sleeve moves.

3. The clutch of claim 1 wherein the spring means includes an open wire loop adapted to fit resiliently within the recess of the cone arm and to move radially inward out of the recess and against a radially inner surface of the cone arm as the clutch sleeve is moved toward the rotatably supported member.

4. A synchronizing clutch for driveably connecting rotatably supported members to a shaft comprising:
    a hub rotatably and displaceably fixed to the shaft, located between and adjacent the rotatably supported member, having a set of spline teeth;
    clutching teeth fixed to each of the rotatably supported members and located adjacent the hub;
    cone elements, one fixed to each rotatably supported member, each cone element having a conical outer surface;
    a clutch sleeve displaceably mounted on the hub for movement into driving engagement with the clutching teeth, having a set of spline teeth engaged with the spline teeth of the hub and blocking surfaces at each axial side of the clutch sleeve, a radial web having a slot therethrough the web having a blocking surface located at each opposite axial side thereof;
    a cone arm extending axially between the cone elements of the rotatably mounted members, having a conical inner surface located at each end of the cone arm adapted to engage the adjacent outer conical surface of the cone element, one conical inner surface being fixed to the cone arm by welding or riveting after the cone arm is inserted through the clutch sleeve slot, blocking surfaces located at opposite axial sides of the clutch sleeve, each blocking surface adapted to contact the corresponding blocking surface of the clutch sleeve as the clutch sleeve is moved axially toward the rotatably supported member and a recess located on the radially inner surface facing the clutch sleeve; and spring means for resiliently releasably connecting the clutch sleeve and cone arm before the cone element and conical inner surface of the cone arm engage and for disconnecting the cone arm and clutch sleeve after the conical inner surface of the cone arm and cone element engage, including a wire loop retained in position with respect to the clutch sleeve and adapted to move axially with the clutch sleeve and seatable in the recess of the cone arm.

5. The clutch of claim 4 wherein the clutch sleeve defines a space between axially spaced radial surfaces into which space the spring means is retained and moved due to contact with the radial surfaces as the clutch sleeve moves.

6. The clutch of claim 4 wherein the clutch sleeve has a radial web having multiple slots angularly spaced about the axis of the shaft, the web having a blocking surface located at each axially opposite side thereof, the cone arm has multiple arms angularly spaced about the axis of the shaft, each arm passing through one of the slots in the radial web, whereby the blocking surfaces of the clutch sleeve contacts the blocking surface of the cone arm as the clutch sleeve moves away from the neutral position and toward a rotatably supported member.

7. The clutch of claim 4 wherein a conical inner surface at one axial end of the cone arm is fixed to the cone arm at one side of the web while a conical inner surface is located at the opposite side of the web and the cone arm extends through the slot.

8. The clutch of claim 4 wherein the spring means includes an open wire loop adapted to fit resiliently with the recess of the cone arm and to move radially inward out of the recess and against a radially inner surface of the cone arm as the clutch sleeve is moved from the neutral position and toward a rotatably supported member.

* * * * *